Dec. 30, 1969  W. J. GREENLEAF  3,486,211
MILLING CUTTER
Filed Nov. 9, 1967  2 Sheets-Sheet 1
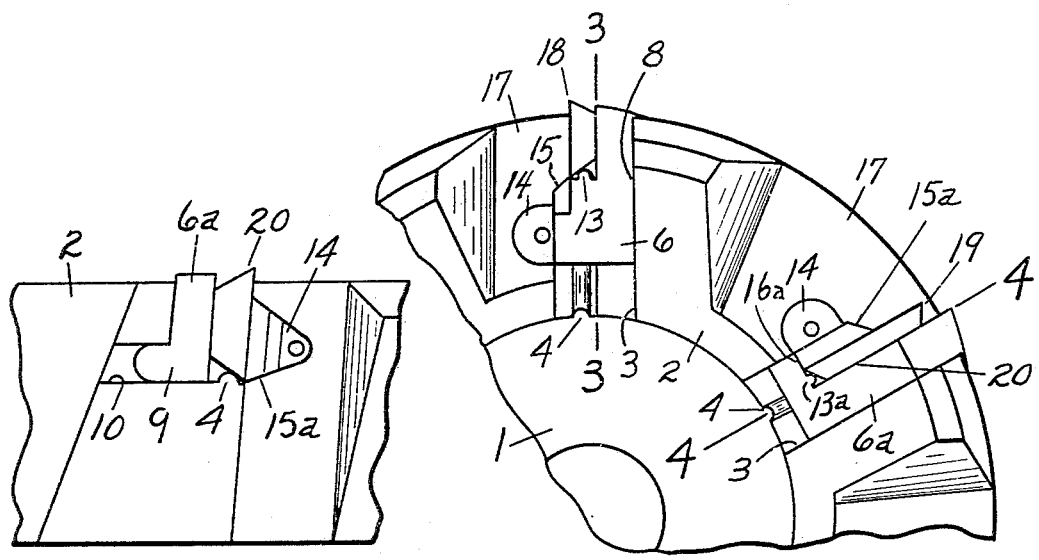
FIG. 2  FIG. 1
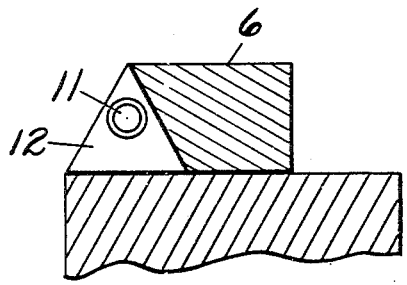 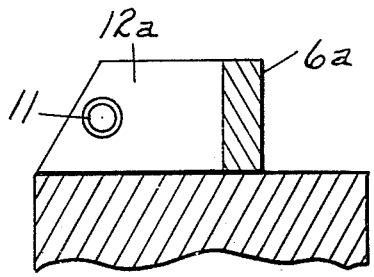
FIG. 3  FIG. 4
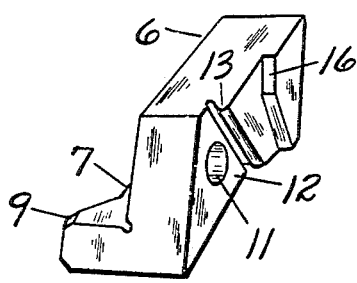 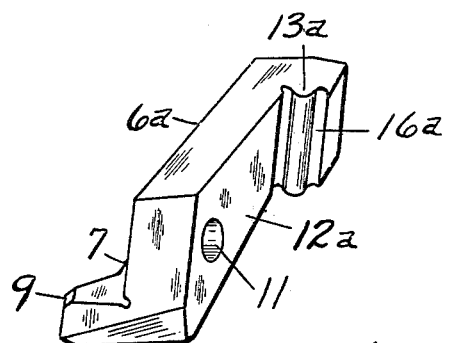
FIG. 5  FIG. 6
INVENTOR
Walter J. Greenleaf
BY Ralph Hauseman
ATTORNEY Dec. 30, 1969    W. J. GREENLEAF    3,486,211
MILLING CUTTER
Filed Nov. 9, 1967    2 Sheets-Sheet 2

INVENTOR
Walter J. Greenleaf
BY Ralph Hammar
ATTORNEY

United States Patent Office 3,486,211
Patented Dec. 30, 1969

3,486,211
MILLING CUTTER
Walter J. Greenleaf, 608 N. Main St. Ext.,
Meadville, Pa. 16335
Continuation-in-part of application Ser. No. 566,151,
July 18, 1966. This application Nov. 9, 1967, Ser.
No. 681,610
Int. Cl. B26d 1/12
U.S. Cl. 29—105
14 Claims

ABSTRACT OF THE DISCLOSURE

An indexable bit for milling cutters having flat edge surfaces for indexing the bit and a flat cutting edge presented to the work at a positive rake angle through the region of greatest depth of cut for a distance substantially equal to the feed per revolution of the milling cutter.

---

This application is a continuation-in-part of application Ser. No. 566,151, filed July 18, 1966, now abandoned.

This invention is an improvement in milling cutters and in milling cutter bits. With present day high powered milling machines it is possible to get high rates of feed, which is the traversing of the cutter across the work or the work past the cutter. Each cutting blade in a cutter is limited to the amount of chip load that it can carry without breaking. The greater number of blades rigidly held in a cutter, the greater feed rate possible, thus producing the parts in less time.

The machine spindle is not always square or normal to the table on which the work piece is mounted, resulting in the front corners of the inserts cutting grooves or feed lines, thus giving a rough finish.

It has been customary to grind slight leads or tapers on the forward or lead edge of each blade so as to eliminate to a great extent the feed marks. This grinding is quite costly and subject to the ability of the grinder hand. Instead of attempting to eliminate the feed marks for each blade, a wiper blade is proposed which will eliminate the feed marks of a plurality of rougher blades. This eliminates the need for costly grinding of the rougher blades.

In a preferred form, the wiper blade has more than one cutting edge, each of which can be indexed to a cutting position without the need for grinding. These cutting edges are formed to produce a slight lead on both sides of a flat so the blade may be used in a right hand or left hand rotating cutter, thus reducing the need to inventory two types of blades. It is difficult to grind the slight lead angles in the conventional manner; however, with the type of blade shown here, broad grinding tolerances can be used while still producing the required accuracy.

A single wiper blade can be used in combination with several rougher blades where the feed per revolution of the cutter is not greater than the width of the flat on the blade. This flat wipes out the feed marks of the roughers and as many wiper blades as wanted can be inserted between roughers. For even distribution of chip load, it is best to have all wiper blades equally spaced around the cutter.

Figure 7:
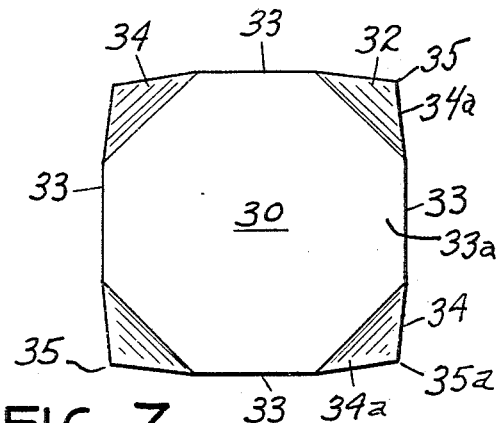
Figure 8:
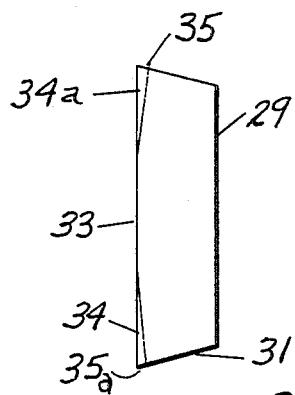
Figure 9:
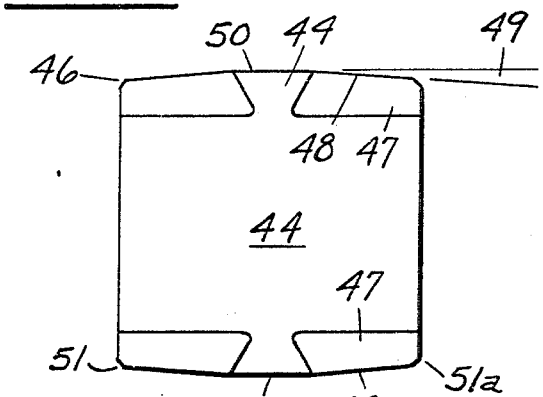
Figure 10:
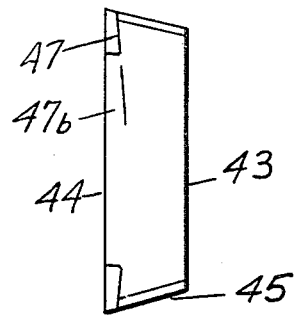
Figure 12:
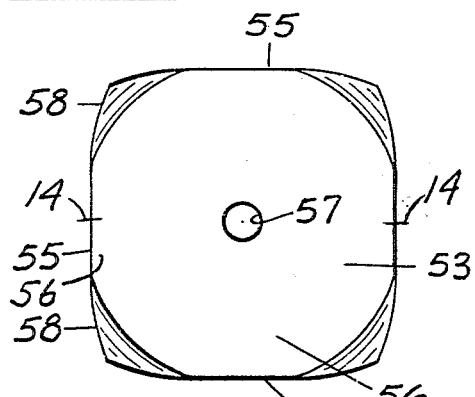
Figure 11:
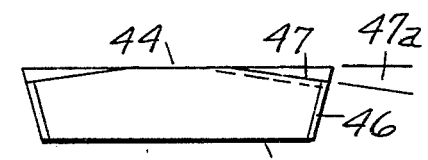
Figure 13:
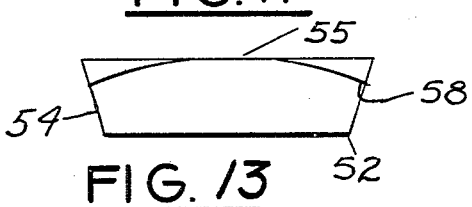
Figure 14:
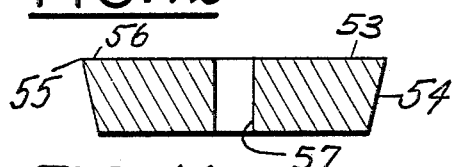

In the drawing, FIG. 1 is a fragmentary plan view of a preferred form of milling cutter showing one roughing and one finish blade, FIG. 2 is a fragmentary edge view of the part of the milling cutter body carrying the finish or wiper blade, FIG. 3 is a section on line 3—3 of FIG. 1, FIG. 4 is a section on line 4—4 of FIG. 1, FIG. 5 is a perspective of the nest for the roughing blade, FIG. 6 is a perspective of the nest for the wiper blade. FIG. 7 is a top plan view of a wiper blade, FIG. 8 is an edge view of the FIG. 7 bit, FIG. 9 is a top plan view of another wiper blade, FIGS. 10 and 11 are edge views of the FIG. 9 bit, FIG. 12 is a top plan view of another wiper blade, FIG. 13 is an edge view of the FIG. 12 bit, and FIG. 14 is a section on line 14—14 of FIG. 12.

The milling cutter has a body 1 having a rim 2 with a plurality of slots 3. The slots may extend radially (as shown) or axially. The radial slots 3 shown may be open at both ends so as to be easily machined and finish ground by straight passes through the rim. In the bottom of each of the slots is an edge seat 4 for one edge of an indexable blade or bit. Interchangeably received in each slot 3 is a nest 6 or 6a, each adapted to receive a different bit. The nest 6 is intended to receive a triangular or roughing bit. The nest 6 has a key 7 received in a suitable keyway, not shown, in the side 8 of the slot 3 and at the front end of the key is a tongue 9 received in a groove 10 (FIG. 2). The purpose of the tongue 9 is to position the bit radially with respect to the cutter body. The purpose of the key 7 is to prevent twisting of the nest with respect to the cutter body. The nest is suitably fixed to the cutter body by a screw in a counterbore 11. On the front face of the nest 6 is a triangular end nest seat 12 for the triangular bit. At the rear of the nest 6 is a sloping edge seat 13 which, in conjunction with the edge seat 4 in the cutter body, provides precise location for the triangular bit in an indexed position. The bit is clamped against the end seat 12 by a clamping member 14 which clamps the bit through an intermediate chip breaker 15. If desired, the chip breaker may be omitted. The rear edge of the chip breaker 15 fits in a seat 16 in the nest 6.

The nest 6a is interchangeable with the nest 6 and corresponding parts are designated by the same reference numerals. The difference in construction in the nest 6a is the end seat 12a for receiving a square finish or wiper bit, the edge seat 13a cooperating with the edge of the square bit, and the seat 16a for the chip breaker 15a. When seated in one of the slots 3, the square bit is clamped against the end seat 12a in the same manner as the triangular bit is clamped against its seat 12. The edge seat 13a in the nest 6a cooperates with the edge seat 4 in the miller cutter body to locate the bit in an indexed position.

The clamps 14 for the bits are located in the bottom of chip clearance grooves 17 which extend through the rim fore and aft of the cutter.

The triangular roughing bits have cutting edges 18 projecting radially outward of the cutting edges 19 of the finishing bits 20. This permits the triangular bits 18 to make a rough cut and to be closely followed by a finishing cut from the finish bit. Since the nests 6a for the finish bit are interchangeable with the nests 6 for the roughing bits, one or more finish bits may be used to accommodate the requirements of the work. By this combination, a milling cutter may take a deep cut and at the same time give an excellent finish.

In FIGS. 7 through 14 are shown various finish or wiper bits usable with the nest 6a. The bit shown in FIGS. 7 and 8 has planar bottom and top surfaces 29 and 30 parallel to each other and planar edge surfaces 31 at right angles to each other and in planes at a positive rake angle to the top surface 30. There are four bevelled surfaces 32, one at each corner of the bit. These bevelled surfaces 32 lie in planes at an acute or negative rake angle to the top surface 30 and produce four cutting edges, each consisting of a flat middle section 33 and downwardly inclined edge sections 34, 34a on each side of the center section. This results in a cutting edge which is crowned, or higher at the center than at the edges. From the flat 33 at the center, the cutting edge falls away both to the right and to the left. The bit is symmetrical and can be used for either right or left hand cutting. If the bit were intended only for right hand or for left hand cutting it need only be half as wide, since the cutting is confined to the flat 33 and the section between the flat and one of the tips 35 or 35a. When installed in the cutter, the bit is tilted slightly forward so that the cutting edges 34 and 34a penetrate the work only slightly less than the flat center section 33. The length of the section 33 is slightly greater than the feed per revolution. The cutting face 33a associated with the section 33 is presented to the work at the same positive rake angle throughout its length thereby obtaining free chip removal desirable for good surface finish. When the center or flat section 33 is adjusted for a depth of cut of five thousandths of an inch, the depth of cut at point 35 (or 35a) might be only two thousandths of an inch. This results in a thin, fine shaving, producing an excellent finish.

The bit shown in FIGS. 9, 10 and 11 has flat bottom and top surfaces 43 and 44 parallel to each other to insure stable clamping and flat edge surfaces 45 at right angles to each other to insure precise location. Flats 46 protect the corners of the blade but are not necessary and may be omitted. At opposite ends of the blade are inclined or bevelled flat surfaces 47 which are ground at a negative radial rake angle 47a relative to the top surface 44 as shown in FIG. 11. The flat surfaces 47 are also ground at a positive axial rake angle 47b relative to the top surface 44 as shown in FIG. 10. The inclination of the surfaces 47 from the top surface produces intersections with the edge surfaces 45 forming cutting edges 48 which form a slight lead angle 49 with the flat wiper section 50 at the center. The same lead angle is present in the FIG. 7 blade.

When mounted in the cutter, the bit is tilted slightly forward so that the center section penetrates the work a few thousandths of an inch more than the tips 51 or 51a. This produces the gradual shaving cut desirable for finish cutting. The length of the flat cutting edge 50 is greater than the maximum feed per revolution of the cutter. As in FIG. 7, the flat cutting edge 50 is presented to the work at a positive rake angle.

The cutter blade shown in FIGS. 12 to 14 has flat bottom and top surfaces 52 and 53 parallel to each other to provide stable clamping and has flat edge surfaces 54 at right angles to each other and in planes at a positive rake angle to the top surface 53. The edge surfaces 54 cooperate with the seats 4 and 13a to provide precise location of the bit in each indexed position. The edge surfaces 54 also provide cutting clearance. When installed in the milling cutter, the flat cutting edge 55 provides the thin, fine shaving desirable for finish. The length of the flat cutting edge 55 is not greater than the feed per revolution of the milling cutter. The cutting face 56 behind each cutting edge 55 is presented to the work at a positive rake angle which is preferably constant throughout the length of the cutting edge. As shown in FIG. 12, the cutting face 56 is in the plane of the top surface 53 of the bit but additional positive rake could be provided by grinding behind each cutting edge. In order to provide a lead into each flat cutting edge 55, the top surface of the bit is provided with a conical surface chamfer concentric with a center hole 57 and intersecting the edge surfaces 54 to form cutting edges 58 on opposite sides of each of the flat cutting edges 55. The conical chamfer is at a negative rake angle with respect to the top surface 53 of the bit. While the negative rake angle is not desirable for finish, it does provide a gradual lead into the flat cutting edges 55 which provide the desired finish. The conical chamfer is conveniently applied by mounting the bit by the center hole 57 and by rotating the bit about the axis of the center hole against a grinding wheel inclined to the desired angle of chamfer.

All of the bits shown in FIGS. 7–14 inclusive are symmetrical in the sense that they are adapted for right hand and left hand cutting. All of the bits have crowned cutting edges which have a few thousandths greater depth of cut at the center than at the outer edges. All of the bits have flat top and bottom surfaces to provide stable clamping and flat or planar edge surfaces to provide precise location. The bit of FIG. 9 is indexable end for end, providing two sets of cutting edges symmetrical about the center. The other bits are indexable in 90° steps providing four sets of cutting edges symmetrical about the center.

What is claimed as new is:

1. A milling cutter having a bit with a flat cutting edge formed by the intersection of a cutting face presented to the work at a positive rake angle and a cutting clearance surface inclined beneath said cutting edge, the cutting edge being flat at the region of greatest depth of cut and a lead edge adjoining one end of the flat cutting edge and formed by the intersection of the cutting clearance surface with a surface at a negative rake relative to the cutting face in a direction lengthwise of said flat cutting edge.

2. The milling cutter of claim 1 in which the negative rake surface is curved and with the negative rake increasing with the distance in a lengthwise direction from said one end of the flat cutting edge.

3. The milling cutter of claim 1 in which the negative rake surface is conical.

4. The milling cutter of claim 1 in which the negative rake surface is planar.

5. The milling cutter of claim 1 in which the negative rake surface is planar and is also inclined at a positive rake angle in a direction transverse to said flat cutting edge.

6. An indexable polygonal milling cutter bit having a bottom face adapted to rest on an end seat of a milling cutter, a top face, several pairs of peripheral edge surfaces transverse to the bottom and top faces and inclined beneath the top faces and providing cutting clearance surfaces, each pair having flat surfaces angularly related to each other adapted to engage complementary angularly related edge seats to position the bit in corresponding indexed positions, a plurality of cutting edges each in active cutting position in a different indexed position of the bit and each having a flat cutting edge by the intersection of a portion of a peripheral edge surface and a portion of the top face presented to the work at a positive rake angle, said flat cutting edge being flat at the region of greatest depth of cut and a lead edge adjoining one end of the flat cutting edge and formed by the intersection of a peripheral edge surface with a surface at a negative rake relative to the top surface in a direction lengthwise of said flat cutting edge.

7. The bit of claim 6 in which the negative rake surfaces forming the lead edges are planar.

8. The bit of claim 6 in which the negative rake surfaces forming the lead edges are planar and are also inclined at a positive rake angle in a direction transverse to said flat cutting edge.

9. The bit of claim 6 in which the negative rake surfaces forming the lead edges are curved with the negative rake increasing with the distance in directions lengthwise from the flat cutting edge.

10. The bit of claim 6 in which the negative rake surfaces forming the lead edges are conical.

11. The bit of claim 6 in which the bit is square.

12. The bit of claim 6 in which the bit is square and the lead edges are formed by bevelled surfaces in planes at an acute angle to the top surface.

13. The bit of claim 6 in which the bit has a center hole and the lead edges are formed by surfaces of revolution concentric with the center hole.

14. The bit of claim 13 in which the surfaces of revolution are conical.

References Cited

UNITED STATES PATENTS

| 2,348,089 | 5/1944 | Niekirk | 29—105 |
| 3,104,453 | 9/1967 | Greenleaf | 29—105 |
| 3,279,034 | 10/1966 | Kaiser | 29—95 |
| 3,279,035 | 10/1966 | Johnson | 29—95 |

HARRISON L. HINSON, Primary Examiner